(12) United States Patent
Debock et al.

(10) Patent No.: US 9,653,194 B2
(45) Date of Patent: May 16, 2017

(54) LOW RESISTANCE INSERT

(71) Applicant: TYCO ELECTRONICS CORPORATION, Berwyn, PA (US)

(72) Inventors: Kimberly Debock, Hummelstown, PA (US); David James Fabian, Mount Joy, PA (US); Brian Todd Klinger, Harrisburg, PA (US)

(73) Assignee: TE CONNECTIVITY CORPORATION, Berwyn, PA (US)

( * ) Notice: Subject to any disclaimer, the term of this patent is extended or adjusted under 35 U.S.C. 154(b) by 400 days.

(21) Appl. No.: 13/964,721

(22) Filed: Aug. 12, 2013

(65) Prior Publication Data

US 2015/0041211 A1 Feb. 12, 2015

(51) Int. Cl.
| | | |
|---|---|---|
| *H01R 4/28* | (2006.01) | |
| *H01R 4/48* | (2006.01) | |
| *H01B 5/00* | (2006.01) | |
| *H01B 1/02* | (2006.01) | |
| *F16J 15/06* | (2006.01) | |
| *H01R 4/06* | (2006.01) | |
| *H01R 4/26* | (2006.01) | |
| *H01R 4/34* | (2006.01) | |
| *H01R 4/62* | (2006.01) | |
| *H01R 11/12* | (2006.01) | |

(Continued)

(52) U.S. Cl.
CPC .............. *H01B 5/00* (2013.01); *F16J 15/064* (2013.01); *H01B 1/023* (2013.01); *H01R 4/06* (2013.01); *H01R 4/26* (2013.01); *H01R 4/34* (2013.01); *H01R 4/62* (2013.01); *H01R 11/12* (2013.01); *H01R 13/533* (2013.01); *B64D 45/02* (2013.01)

(58) Field of Classification Search
CPC . H01R 11/12; H01R 4/06; H01R 4/26; H01R 4/34; H01R 4/62; H01R 4/28
USPC ........... 174/74 R, 126.3, 94 R; 439/817, 927
See application file for complete search history.

(56) References Cited

U.S. PATENT DOCUMENTS

| | | | | |
|---|---|---|---|---|
| 491,173 A | * | 2/1893 | Hayward | ................. F16B 39/24 |
| | | | | 411/154 |
| 662,003 A | * | 11/1900 | Lamm | ...................... H01R 4/26 |
| | | | | 277/654 |

(Continued)

FOREIGN PATENT DOCUMENTS

| | | | | |
|---|---|---|---|---|
| FR | 2704101 A3 | * | 10/1994 | ............... H01R 4/26 |

OTHER PUBLICATIONS

International Search Report, International Application No. PCT/US2014/049328, International Filing Date, Aug. 1, 2014.

(Continued)

*Primary Examiner* — William H Mayo, III
*Assistant Examiner* — Rhadames J Alonzo Miller

(57) ABSTRACT

A conductive insert which provides a low resistance bond between low conductive materials. The insert includes a first surface and an oppositely facing second surface. A plurality of openings extends between the first surface and the second surface. At least one first projection extends from the first surface proximate respective first openings, the at least one first projections extend from the first surface in a direction away from the second surface. At least one second projection extends from the second surface proximate respective second openings, the at least one second projections extend from the second surface in a direction away from the first surface.

17 Claims, 4 Drawing Sheets

(51) Int. Cl.
*H01R 13/533* (2006.01)
*B64D 45/02* (2006.01)

(56) References Cited

U.S. PATENT DOCUMENTS

| | | | | |
|---|---|---|---|---|
| 2,069,402 A * | 2/1937 | Cowlin | F16B 39/24 | 411/147 |
| 2,796,457 A * | 6/1957 | Stinger | H04B 15/025 | 174/351 |
| 2,946,039 A * | 7/1960 | Grunwald | H01R 4/34 | 411/531 |
| 3,247,316 A * | 4/1966 | Weimer, Jr. | H01R 4/2495 | 174/84 C |
| 3,549,786 A * | 12/1970 | Kuo | H01R 4/2495 | 174/84 C |
| 3,626,357 A * | 12/1971 | Kindell | H01R 4/26 | 439/433 |
| 3,634,807 A * | 1/1972 | Grobe | H01R 12/7082 | 174/253 |
| 3,736,627 A * | 6/1973 | Sosinski | H01R 4/2495 | 24/20 W |
| 3,752,901 A * | 8/1973 | Kuo | H01R 4/2495 | 174/84 C |
| 3,761,867 A * | 9/1973 | Churla | H01R 4/2479 | 411/160 |
| 3,881,799 A * | 5/1975 | Elliott et al. | H01R 4/26 | 174/253 |
| 3,895,851 A | 7/1975 | Bolton et al. | | |
| 3,914,490 A | 10/1975 | Fusiek | | |
| 4,009,925 A * | 3/1977 | Hoogeveen | H01R 4/00 | 174/94 R |
| 4,023,882 A * | 5/1977 | Pettersson | H01R 4/26 | 439/426 |
| 4,060,301 A * | 11/1977 | Beatty | H01B 17/04 | 174/141 R |
| 4,061,413 A * | 12/1977 | Keller | H01R 4/64 | 174/351 |
| 4,080,033 A * | 3/1978 | Deal | H01R 13/187 | 439/816 |
| 4,182,541 A * | 1/1980 | Galaini | H01R 4/28 | 439/357 |
| 4,511,200 A * | 4/1985 | Belokin, Jr. | H01R 4/28 | 439/226 |
| 4,550,965 A * | 11/1985 | Izraeli | H01R 4/2408 | 439/284 |
| D287,240 S * | 12/1986 | Noorily | | D13/147 |
| 4,687,263 A | 8/1987 | Cosmos et al. | | |
| 4,691,972 A * | 9/1987 | Gordon | H05K 3/365 | 361/749 |
| 4,875,876 A * | 10/1989 | O'Loughlin | H01R 4/38 | 439/431 |
| 4,943,247 A * | 7/1990 | Wise | H01R 4/34 | 439/883 |
| 5,105,537 A * | 4/1992 | Datta | H01R 13/22 | 205/667 |
| 5,118,299 A * | 6/1992 | Burns | H01L 23/32 | 439/290 |
| 5,137,461 A * | 8/1992 | Bindra | H01L 24/83 | 200/268 |
| 5,172,473 A * | 12/1992 | Burns | H01L 23/32 | 29/885 |
| 5,190,463 A * | 3/1993 | Datta | H01R 13/22 | 439/74 |
| 5,791,654 A | 8/1998 | Gaines et al. | | |
| 5,865,638 A * | 2/1999 | Trafton | H01R 11/12 | 439/288 |
| 6,186,799 B1 * | 2/2001 | Mello | H01R 4/64 | 238/14.14 |
| 6,357,764 B1 | 3/2002 | Gaines et al. | | |
| 6,420,664 B1 * | 7/2002 | Muramatsu | H01L 23/3114 | 174/260 |
| 6,454,267 B1 | 9/2002 | Gaines et al. | | |
| 6,454,276 B2 | 9/2002 | Gaines et al. | | |
| 6,719,293 B1 | 4/2004 | Coles et al. | | |
| 8,303,357 B2 * | 11/2012 | Kuwahara | H01R 4/26 | 411/160 |
| 8,393,068 B2 | 3/2013 | Keener | | |
| 2003/0068905 A1* | 4/2003 | Jensen | H01R 12/81 | 439/66 |
| 2005/0116427 A1 | 6/2005 | Seidel et al. | | |
| 2005/0121859 A1 | 6/2005 | Seidel et al. | | |
| 2007/0248434 A1* | 10/2007 | Wiley | F16B 7/187 | 411/160 |
| 2011/0203838 A1* | 8/2011 | MacDougall | H01R 12/52 | 174/257 |
| 2011/0287644 A1* | 11/2011 | Kuwahara | H01R 4/26 | 439/110 |
| 2012/0275066 A1* | 11/2012 | O'Brien | F24J 2/5237 | 361/1 |
| 2012/0279748 A1* | 11/2012 | Martens | H01R 4/00 | 174/80 |
| 2013/0122760 A1* | 5/2013 | Bakos | H01R 4/28 | 439/878 |
| 2013/0316601 A1* | 11/2013 | Kellerman | H01R 4/304 | 439/884 |
| 2014/0261640 A1* | 9/2014 | Andrews | B21D 22/00 | 136/251 |

OTHER PUBLICATIONS

Pierced Metal Products—Plasticore-Gasketcore: Diamond Manufacturing Company, 2 pgs, Apr. 2013, http://www.diamondman.com/pierced-metal-products.

* cited by examiner

LOW RESISTANCE INSERT

FIELD OF THE INVENTION

The present invention is directed to a conductive insert which provides a low resistance bond between low conductive materials. In particular, the invention is directed to an insert or screen which cooperates with light weight material, such as aluminum, to break through any sealant and/or aluminum oxide provided on the surface.

BACKGROUND OF THE INVENTION

A need has been identified in many industries to reduce the weight of products by reducing the weight of the components by utilizing lighter weight materials. As an example, the airline industry desires to reduce the weight of the aircraft, thereby reducing the fuel consumption, which in turn, reduces cost. This can be achieved, in part, by replacing the base metal in copper terminals with lighter weight material such as aluminum. This need follows the change from copper wire to aluminum wire on aircraft. However, prior to converting the terminals to a lighter weight material, it must be confirmed that a positive electrical connection will be effected with the lighter weight material.

Known methods of providing coupling between mating surfaces in aircraft having aluminum structures are generally limited to the uses of cured elastomer gaskets, metallic gaskets using sealants, or a multiple use of corrosion inhibitors and plating. The cured elastomer gaskets allow moisture between the mating surfaces and tend to become bonded/adhere or retain a memory under compression to the two surfaces after a period of time and temperature cycling. The metallic gaskets also have a permanent bonding problem due to the application of adhesives to reduce the moisture ingress between the two surfaces. The use of the corrosion resistant compounds and sealants creates a time consuming process in application and removal and tend to crack during structure flexing, thereby allowing moisture to ingress between the mating surfaces and causing a breakdown of the inhibitors.

In addition, most gaskets presently used have a base material so dissimilar to aluminum that they thereby cause galvanic corrosion, rather than prevent it, due to the fact that they cannot provide a hermetic seal by themselves and require the use of an outside sealant which when used in high vibration areas or under flexing conditions tends to crack and thereby introduces an electrolyte that creates a galvanic cell.

It would be beneficial to provide conductive insert which does not require a gasket and which can be used between aluminum terminals and the aluminum structure of an aircraft which is cost effective and which can provide a positive electrical connection through a low resistance bond between low conductive materials, thereby eliminating the need for inhibitor greases to be applied to the aluminum. It would also be beneficial to provide an insert which minimizes application time and removal time. It would also be beneficial eliminates structural and component damage during removal and which protects the integrity of the installation in harsh environments associated with aircraft, such as, but not limited to, altitude, vibration, structural flexing, and extreme temperatures.

SUMMARY OF THE INVENTION

An embodiment is directed to an insert which can be used with aluminum terminals which are intended for use with composite structure aircrafts. In one embodiment, the insert is a stamped screen which provides for low bond resistance between the terminals and the shell of the aircraft.

An embodiment is directed to a conductive insert which provides a low resistance bond between low conductive materials. The insert includes a first surface and an oppositely facing second surface. A plurality of openings extends between the first surface and the second surface. At least one first projection extends from the first surface proximate respective first openings, the at least one first projections extend from the first surface in a direction away from the second surface. At least one second projection extends from the second surface proximate respective second openings, the at least one second projections extend from the second surface in a direction away from the first surface. The insert provides a stable, low resistance electrically conductive path between the conductive materials.

An embodiment is directed to a conductive insert made from conductive material which has a conductivity equal to or higher than the conductivity of aluminum thereby providing a low bond resistance between low conductive materials. Monel is one example of such a material, however, other materials can be used without departing from the scope of the invention. The insert includes a first surface and an oppositely facing second surface. A plurality of openings extends between the first surface and the second surface. At least one first projection extends from the first surface proximate respective first openings, the at least one first projections extend from the first surface in a direction away from the second surface. At least one second projection extends from the second surface proximate respective second openings, the at least one second projections extend from the second surface in a direction away from the first surface. At least one mounting opening extends through the first surface and the second surface, the mounting opening configured to cooperate with mounting hardware. The insert provides a stable, low resistance electrically conductive path between the lower conductive materials of the terminals and the mating surface.

An embodiment is directed to an assembly having a terminal, a conductive surface, and a conductive insert. The conductive insert is made from conductive material which has a conductivity equal to or higher than the conductivity of aluminum. The insert includes a first surface and an oppositely facing second surface. A plurality of openings extends between the first surface and the second surface. At least one first projection extends from the first surface proximate respective first openings, the at least one first projections extend from the first surface in a direction away from the second surface. At least one second projection extends from the second surface proximate respective second openings, the at least one second projections extend from the second surface in a direction away from the first surface. At least one mounting opening extends through the first surface and the second surface, the mounting opening configured to cooperate with mounting hardware. At least one first projection penetrates any sealants or oxides present on the terminal and the at least one second projection penetrates any sealants or oxides present on the conductive surface, thereby providing a stable, low resistance electrically conductive path between the terminal and the conductive surface.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

Figure 1:
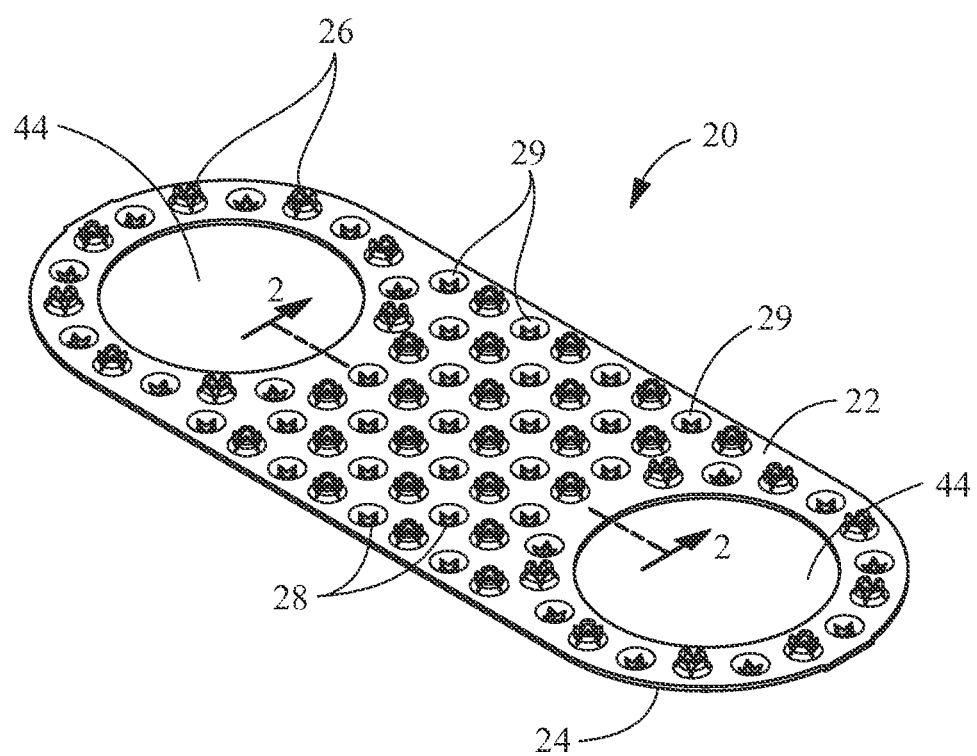
FIG. 1 is a perspective view of an illustrative embodiment of an insert according to the present invention.

The present invention will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that spatially relative terms, such as "top", "upper", "lower" and the like, may be used herein for ease of description to describe one element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "over" other elements or features would then be oriented "under" the other elements or features. Thus, the exemplary term "over" can encompass both an orientation of over and under. The device may be otherwise oriented (rotated 90 degrees or at other orientations) and the spatially relative descriptors used herein interpreted accordingly.

The present invention is directed to a conductive insert which provides a stable, low resistance electrically conductive path between conductive materials. In particular, the invention is directed to an insert or screen which cooperates with light weight material, such as aluminum, to shear the aluminum oxide present on the surface, thereby eliminating the need for inhibitor greases to be applied to the aluminum.

Figure 2:
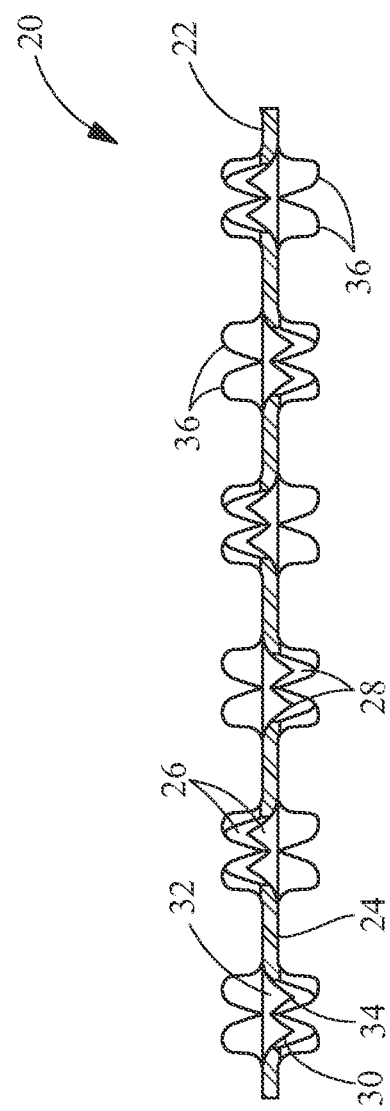
FIG. 2 is an enlarged cross-sectional view showing several of the projections of the insert taken along line 2-2 of FIG. 1.

As shown in FIGS. 1 and 2, an illustrative embodiment of an insert 20 is shown. Insert 20 is provided with a first surface 22 and an oppositely facing second surface 24. In the embodiment shown, the insert is made from a conductive material which has a conductivity equal to or higher than the conductivity of aluminum thereby providing a low bond resistance between low conductive materials. Monel is one example of such a material, however, other materials can be used without departing from the scope of the invention. In the embodiment shown, the insert 20 has a thickness of between about 0.006 inches to about 0.012 inches, above about 0.006 inches, below about 0.012 inches, about 0.006 inches, about 0.007 inches, about 0.008 inches, about 0.009 inches, about 0.010 inches, about 0.011 inches, about 0.012 inches, or any combination thereof. However, other dimensions may be used without departing from the scope of the invention. In addition, other electrically conducting materials can be used, such as, but not limited to, copper or copper alloys. The type of material is dependent upon the application. In the embodiment shown, the insert is made from aluminum or an aluminum alloy as the insert is used to electrically connect an aluminum terminal to an aluminum substrate or surface, as will be more fully described. Although an essentially flat, planar configuration is shown, other suitable configurations may be readily employed without departing from the spirit or scope of the invention.

A plurality of piercing means such as barbs or projections 26, 28 extend from the first surface 22 and the second surface 24. Projections 26 are aligned in similarly facing disposition extending from the first surface 22 in a direction away from the second surface 24. The projections 28 are aligned in similarly facing disposition extending from the second surface 24 in a direction away from the first surface 22. The projections 26 are spaced from, and extend in essentially the opposed direction, of the projections 28.

The projections 26, 28 extend generally transversely across the respective surfaces 22, 24 of the insert 20. The projections 26, 28 extend at an angle relative to the longitudinal axis of insert 20. In some embodiments, the projections 26, 28 extend essentially generally normal to the longitudinal axis of insert 20. The alignment of projections 26, 28 with respect to the longitudinal axis of insert 20 may, of course, be varied, as necessary or desirable, to effect other suitable configurations such as those shown. The projections 26, 28 any be arranged in essentially aligned or patterned relationship or may be disposed in selectively staggered or scattered arrangement. Although the projections 26, 28 shown in the illustrative embodiment are disposed along substantially the entire surface 22, 24 of insert 20, the arrangement may be appropriately altered or modified wherein said projections 26, 28 are disposed over either a selected portion of or the entire area encompassed by one or more of the surfaces 22, 24 of insert 20.

The projections 26, 28 may be formed by any one of a number of suitable methods which deform the surfaces of the insert 20, such as, but not limited to, lancing, skiving, punching, or stamping, in either one or more appropriate operations, to obtain the desired configuration of the projections 26, 28. The formation of the projections 26, 28 results in openings 29 extending through the insert between the first surface 22 and the second surface 24. Each opening 29 has at least one projection 26, 28 which is provide proximate thereto. However, in most applications, three or more projections 26, 28 are provided proximate each opening 29.

As best illustrated in FIG. 1, each opening 29 has either projections 26 extending therefrom and proximate thereto or projections 28 extending therefrom and proximate thereto. Also in the embodiment shown, an opening 29 which has projections 26 extending therefrom is surrounded by openings 29 which has projections 28 extending therefrom. Similarly, an opening 29 which has projections 28 extending therefrom is surrounded by openings 29 which has projections 26 extending therefrom. This allows openings 29 with projections 26 to alternate with openings 29 with projections 28 across the entire first surface 22 and second surface 24 of the insert 20.

As shown in greater detail in FIG. 2, each projection 26, 28 comprises, essentially, a triangular member 30 having a fixed base 32 and a free end 34. The fixed base is attached to a respective surface 22, 24. The free end 34 extends from a respective surface 22, 24 at an angle to the respective surface 22, 24. In some embodiments, free end 34 extends from a respective surface 22, 24 at an angle essentially normal to the respective surface 22, 24. The free end 34 is in the form of a sharp edge or point 36 which is formed by two sides of the triangular member 30. The preferably sharp edges 36 of projections 28 serve to provide a piercing surface adequately proportioned to enable the projections 28 to penetrate any sealants used on the mating terminal and/or the mating surface which are used to environmentally seal the components. In addition, preferably sharp edges 36 of projections 28 serve to provide a piercing surface adequately proportioned to enable the projections 28 to penetrate any oxides which may be present on the mating terminal and/or the mating surface. While sharp edges 36 are shown, other configurations, such as, but not limited to, bifurcated ends or barbed-headed configurations may be used.

The particular shape of projections 26, 28 may vary depending upon the method used to form the projections 26, 28. However, regardless of the shape, the projections 26, 28 will have a free end with a piercing surface to enable the projections 26, 28 to penetrate any sealants used on the mating terminal and/or the mating surface which are used to environmentally seal the components.

Figure 3:
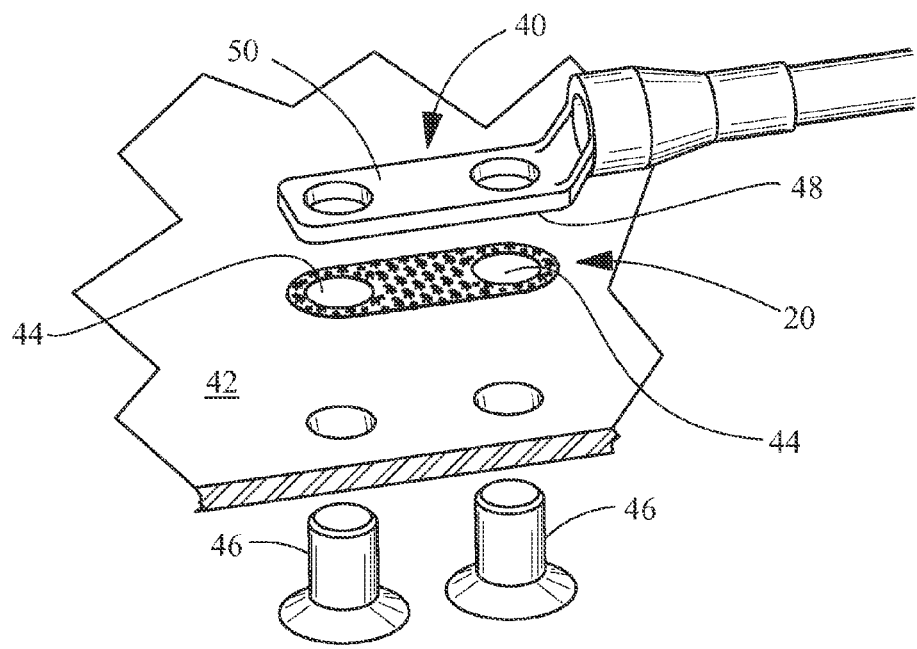
FIG. 3 is an exploded perspective view of the insert positioned between a terminal and a mating surface.
Figure 4:
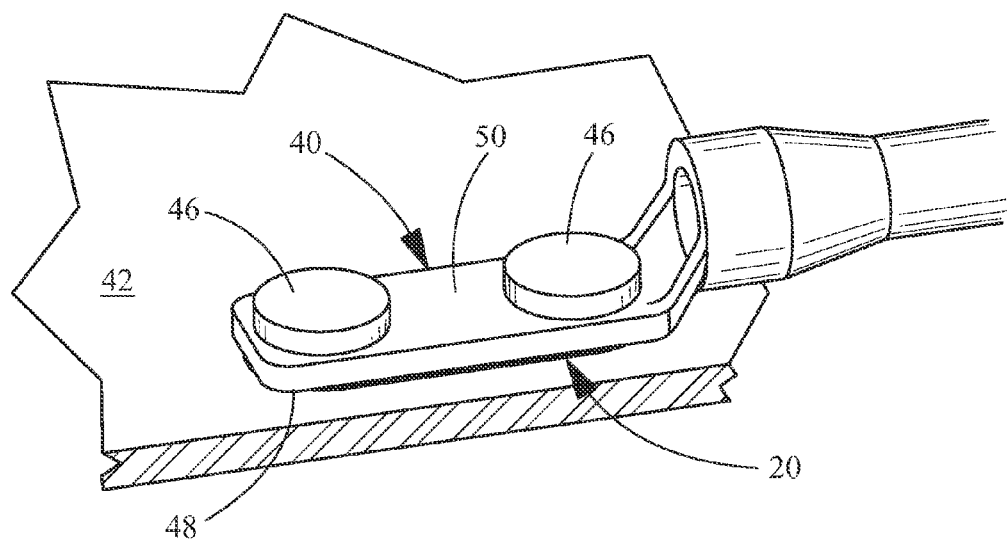
FIG. 4 is a perspective view of the insert, terminal and mating surface of FIG. 3 shown in the fully assembled position.
Figure 5:
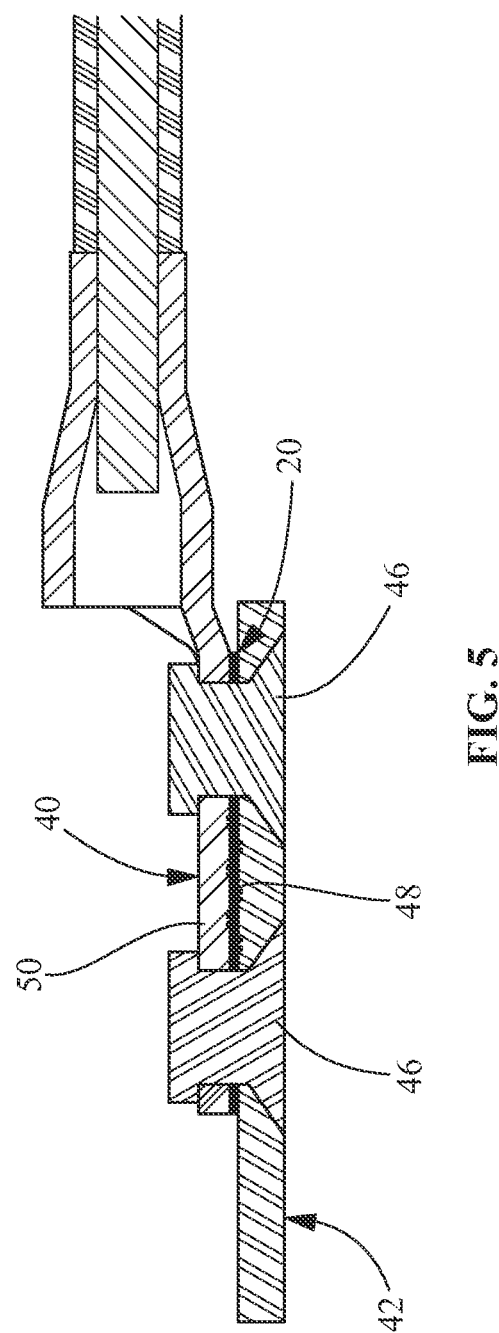
FIG. 5 is a cross-sectional view of the assembly taken along the longitudinal axis of the insert.

Referring to FIGS. 3 through 5, the insert 20 is shown engaged between a terminal 40 and a mating surface 42. In the embodiment shown, the terminal 40 is made from aluminum or an aluminum alloy. However, other electrically conducting materials can be used, such as, but not limited to, copper or copper alloys. The type of material is dependent upon the application. In the embodiment shown, the mating substrate, panel or surface 42 is a surface of an aircraft structure which is made from aluminum or an aluminum alloy. However, other applications and other electrically conducting materials can be used, such as, but not limited to, copper or copper alloys. The type of material is dependent upon the application.

The terminal 40 may be, but is not limited to, a sealed aluminum terminal sold by TE Connectivity. Such a terminal provides a reliable and stable electro-mechanical "dry sealed crimp" for both copper and aluminum stranded wire. When such terminals are crimped to aluminum wire, the wire's conductor material is extruded through the perforations of a terminal insert. This extrusion shears the aluminum oxide on the wire strands and provides intimate contact between the terminal and wire conductor, thus eliminating the need for inhibitor greases (i.e. "wet crimp"). The reduction in area achieved during crimping is such that cold welds are formed between both the terminal and wire conductor and the wire strands themselves.

In use, the insert 20 is positioned between the terminal 40 and the surface 42. Mounting openings 44, which extend through the insert 20, cooperate with mounting hardware or fasteners 46, such as, but not limited to, rivets, screws, nuts and bolts or their equivalent, to maintain the insert 20 in position relative to the terminal 40 and relative to the surface 42. The mounting hardware 46 is deformed or tightened causing the terminal 40 to move toward the surface 42. As this occurs, the insert 20 is subjected to a compressive force, causing the projections 26 which extend from the first surface 22 to contact a surface 48 of the terminal lug 50 of the terminal 40. As this occurs, the edges 36 of the fee ends 34 of the projections 26 penetrate any sealants used or oxides present on the surface 48 of the terminal 40. In addition, as the insert 20 is subjected to a compressive force, the projections 28 which extend from the second surface 24 are forced to contact the surface 42. As this occurs, the edges 36 of the fee ends 34 of the projections 28 penetrate any sealants used or oxides present on the surface 42.

As the projections 26, 28 are compressed, the edges 36 of the projections 26, 28 may also be moved in a direction which is essentially parallel to the longitudinal axis of the insert 20. This allows the edges 36 of the projections to move transversely to the motion of compressions, allowing the projections 26, 28 to provide a wiping action on the surface 48 of the terminal 40 and the surface 42, thereby enhancing the projections 26, 28 ability to pierce the sealants, as previously described. The compressive force and wiping action thus provide a positive electrical connection between the terminal 40 and insert 20 and between the insert 20 and the surface 42. Consequently, as the insert is conductive, a positive electrical connection is effected between the terminal 40 and the surface 42. The degree of penetration and wiping action of the projections 26, 28 may be selectively controlled by modifying the shape of the projections 28, including, but not limited to, the shape of the edges 36. The degree of penetration and wiping action of the projections 26, 28 may also be selectively controlled by modifying the thickness of the insert 20.

The use of the insert 20 allows the electrical path established between the terminal 40 and the surface or substrate 42 to be maintained at a stable, low resistance bond for the life of the installation. This electrical path requires minimum preparation during the terminal installation procedure, or during a maintenance check once in service. In addition, a standard torque wrench, or other readily accessible hand tool, is the only tool that is required to install the terminal lug on, or to remove the terminal lug from, the surface or substrate to which it is attached.

In one embodiment, the surface 48 of the terminal lug 50 and the surfaces 22, 24 of the insert 20 shall be flat within ±5 mils, so that the lowest possible bond path resistance can be achieved when the terminal lug 50 is attached to the surface 42 by means of the insert 20.

In one embodiment, the terminal lugs 50 are attached to the surface 42 by two mounting fasteners 46, although other configurations and number of fasteners can be used.

As the terminals lugs 50, insert 20 and surface 42 are made from similar material, neither the terminal lugs nor the inserts exhibit any evidence of peeling, cracks, fissures, corrosion, blistering, peeling or separation of plating that would adversely affect the electrical and mechanical performance of the assembly.

While the invention has been described with reference to a preferred embodiment, it will be understood by those skilled in the art that various changes may be made and equivalents may be substituted for elements thereof without departing from the spirit and scope of the invention of the invention as defined in the accompanying claims. In particular, it will be clear to those skilled in the art that the present invention may be embodied in other specific forms, structures, arrangements, proportions, sizes, and with other elements, materials, and components, without departing from the spirit or essential characteristics thereof. One skilled in the art will appreciate that the invention may be used with many modifications of structure, arrangement, proportions, sizes, materials, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims, and not limited to the foregoing description or embodiments.

The invention claimed is:

1. A conductive insert which provides a low resistance bond between low conductive materials, the insert comprising:
   a first surface and an oppositely facing second surface;
   a plurality of openings extending between the first surface and the second surface;
   multiple first triangular projections extending proximate each of respective first openings, the multiple first triangular projections extend at an angle relative to a longitudinal axis of the insert, the multiple first triangular projections of each of the respective first openings extending from the first surface in a direction away from the second surface, each of the multiple first triangular projections having a first fixed end and a first free end formed by two sides of the first triangular projection, the first free ends having first sharp edges or first points to provide first piercing surfaces which are moveable in a direction which is essentially parallel to a longitudinal axis of the insert to provide a wiping action on a first surface of the conductive material;
   multiple second triangular projections extending proximate each of respective second openings, the multiple second triangular projections extend at an angle relative to a longitudinal axis of the insert, the multiple second triangular projections of each of the respective second openings extending from the second surface in a direction away from the first surface, each of the multiple second triangular projections having a second fixed end and a second free end formed by two sides of the second triangular projection, the second free ends having second sharp edges or second points to provide second piercing surfaces which are moveable in a direction which is essentially parallel to a longitudinal axis of the insert to provide a wiping action on a second surface of the conductive material;
   wherein the insert provides a stable, low resistance electrically conductive path between the conductive materials.

2. The conductive insert as recited in claim 1, wherein three or more multiple projections are provided proximate each of the first openings, and three or more multiple second projections are provided proximate each of the second openings.

3. The conductive insert as recited in claim 1, wherein the respective first openings are surrounding be respective second openings, whereby the multiple first projections alternate with the multiple second projections across the first surface and second surface.

4. The conductive insert as recited in claim 1, wherein the insert is made from conductive material which has a conductivity equal to or higher than the conductivity of aluminum.

5. The conductive insert as recited in claim 1, wherein the openings are selectively staggered.

6. The conductive insert as recited in claim 1, wherein the multiple first projections and the multiple second projections are disposed in a patterned relationship.

7. The conductive insert as recited in claim 1, wherein the plurality of openings are disposed along substantially the entire first surface and entire second surface.

8. The conductive insert as recited in claim 1, wherein at least one mounting opening extends through the first surface and the second surface of the insert, the mounting opening configured to cooperate with mounting hardware.

9. A conductive insert made from conductive material which has a conductivity equal to or higher than the conductivity of aluminum, the conductive insert provides a low resistance bond between conductive materials, the insert comprising:
   a first surface and an oppositely facing second surface;
   a plurality of openings extending between the first surface and the second surface;
   first triangular projections extending proximate each of first openings, the first triangular projections extend at an angle relative to a longitudinal axis of the insert, the first triangular projections of each of the respective first openings extending from the first surface in a direction away from the second surface, each of the first triangular projections having a first fixed end and a first free end formed by two sides of the first triangular projection, the first free ends having first sharp edges or first points to provide first piercing surfaces which are moveable in a direction which is essentially parallel to a longitudinal axis of the insert to provide a wiping action on a first surface of the conductive material, the first sharp edges provide a piercing surface to enable the first triangular projections to penetrate any sealants or oxides which are present on the first surface of the conductive material;
   second triangular projections extending proximate each of second openings, the second triangular projections extend at an angle relative to a longitudinal axis of the insert, the second triangular projections of each of the respective second openings extending from the second surface in a direction away from the first surface, each of the second triangular projections having a second fixed end and a second free end formed by two sides of the second triangular projection, the second free ends having second sharp edges or second points to provide second piercing surfaces which are moveable in a direction which is essentially parallel to a longitudinal axis of the insert to provide a wiping action on a second surface of the conductive material, the second sharp edges provide a piercing surface to enable the second triangular projections to penetrate any sealants or oxides which are present on the second surface of the conductive material;
   at least one mounting opening extending through the first surface and the second surface, the mounting opening configured to cooperate with mounting hardware;
   wherein the insert provides a stable, low resistance electrically conductive path between the conductive materials.

10. The conductive insert as recited in claim 9, wherein three or more first projections are provided proximate each respective first opening, and three or more second projections are provided proximate each respective second opening.

11. The conductive insert as recited in claim 10, wherein the respective first openings are surrounding be respective second openings, whereby the first projections alternate with the second projections across the first surface and second surface.

12. The conductive insert as recited in claim 9, wherein the openings are selectively staggered.

13. The conductive insert as recited in claim 9, wherein the first projections and the second projections are disposed in a patterned relationship.

14. The conductive insert as recited in claim 13, wherein the plurality of openings are disposed along substantially the entire first surface and entire second surface.

15. An assembly comprising:
a terminal;
a conductive surface;
a conductive insert made from aluminum or an aluminum alloy, the insert comprising:
a first surface and an oppositely facing second surface;
a plurality of openings extending between the first surface and the second surface;
first triangular projections extending from each of first openings, the first triangular projections extend at an angle relative to a longitudinal axis of the insert, the first projections of each of the respective first openings extending from the first surface in a direction away from the second surface, each of the first triangular projections having a first fixed end and a first free end formed by two sides of the first triangular projection, the first free ends having first sharp edges or first points to provide first piercing surfaces which are moveable in a direction which is essentially parallel to a longitudinal axis of the insert to provide a wiping action on a first surface of the conductive material;
second triangular projections extending from each of second openings, the second triangular projections extend at an angle relative to a longitudinal axis of the insert, the second projections of each of the respective second openings extending from the second surface in a direction away from the first surface, the second projections having a second fixed end and a second free end formed by two sides of the second triangular projection, the second free ends having second sharp edges or second points to provide second piercing surfaces which are moveable in a direction which is essentially parallel to a longitudinal axis of the insert to provide a wiping action on a second surface of the conductive material;
at least one mounting opening extending through the first surface and the second surface, the mounting opening configured to cooperate with mounting hardware;
wherein the first projections penetrate any sealants or oxides present on the terminal and the second projections penetrate any sealants or oxides present on the conductive surface, thereby providing a stable, low resistance electrically conductive path between the terminal and the conductive surface.

16. The conductive insert as recited in claim 15, wherein three or more first projections are provided proximate the first openings, and three or more second projections are provided proximate the second openings.

17. The conductive insert as recited in claim 15, wherein the respective first openings are surrounding be respective second openings, whereby the first projections alternate with the second projections across the first surface and second surface.

* * * * *